(12) United States Patent
Smith et al.

(10) Patent No.: US 10,630,109 B2
(45) Date of Patent: Apr. 21, 2020

(54) RX HEADROOM ADJUSTMENT FOR STABILITY IMPROVEMENT IN WIRELESS POWER SYSTEMS

(71) Applicant: Integrated Device Technology, Inc., San Jose, CA (US)

(72) Inventors: Nicholaus Smith, La Mesa, CA (US); Detelin Martchovsky, Fremont, CA (US); Tuyen Doan, San Jose, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 213 days.

(21) Appl. No.: 15/462,523

(22) Filed: Mar. 17, 2017

(65) Prior Publication Data

US 2018/0269724 A1    Sep. 20, 2018

(51) Int. Cl.
*H02J 50/12* (2016.01)
*H02J 50/80* (2016.01)

(52) U.S. Cl.
CPC .............. *H02J 50/12* (2016.02); *H02J 50/80* (2016.02)

(58) Field of Classification Search
CPC .. H02J 50/12; H02J 50/80; H02J 50/90; H02J 50/40; H02J 5/005; H02J 7/025; H02J 17/00
USPC ........................................................ 307/104
See application file for complete search history.

(56) References Cited

U.S. PATENT DOCUMENTS

2016/0241083 A1\*    8/2016    He ........................ H02J 50/80

\* cited by examiner

*Primary Examiner* — Carlos Amaya
(74) *Attorney, Agent, or Firm* — Haynes and Boone, LLP

(57) ABSTRACT

A wireless power system includes a receiver. The receiver may include a rectifier coupled to a receiver coil to receive power. The receiver may include a detector coupled to the rectifier to receive a monitor signal from the rectifier. The detector may provide a range signal indicating whether the monitor signal is outside a predetermined range. The receiver further includes an oscillation determiner coupled to the detector to receive the range signal. The oscillation determiner may determine that the rectifier is in an oscillation mode or is not in an oscillation mode. In some embodiments a communication unit is coupled to the oscillation determiner. The oscillation determiner may communicate a power adjustment signal and may request increased power through the communication unit.

14 Claims, 9 Drawing Sheets

RX HEADROOM ADJUSTMENT FOR STABILITY IMPROVEMENT IN WIRELESS POWER SYSTEMS

TECHNICAL FIELD

Embodiments of the present invention are related to wireless power systems and, specifically, to stability of wireless power receivers.

DISCUSSION OF RELATED ART

Mobile devices, for example smart phones and tablets, are increasingly using wireless power charging systems. Strong communication pulses between the transmitter and receiver, however, can cause oscillations at the receiver for some load levels. Such oscillation can appear at different load levels based on alignment and other system parameters, load steps, or rising or falling loads. The oscillations can cause output instability and may reduce system efficiency.

Wireless power systems are much more efficient when the voltage difference between the rectifier output voltage and power system output voltage is small. However, with that small difference communication pulses and load variations may cause the power receiver system to settle at a point where the rectifier voltage goes into oscillation due to current flow direction through the rectifier and voltage changes on the receiver LC tank.

Therefore, there is a need to develop a scheme to prevent the oscillations.

SUMMARY

Embodiments of the present disclosure provide schemes for stopping oscillation at a receiver of a wireless power system. A device such as a detector may be incorporated in the receiver of the wireless power system such that the device can determine the oscillation state of the receiver and can generate a signal identifying the oscillation state of the receiver. The generated signal can be used by the wireless power system to stop the oscillations.

In accordance with aspects of the disclosure a receiver of a wireless power system is presented. The receiver includes a rectifier that is coupled to the receiver and may receive power from a receiver coil. The receiver also includes a detector coupled to the rectifier to receive a monitor signal from the rectifier and provide a range signal indicating whether the monitor signal is outside a predetermined range. The receiver further includes an oscillation determiner coupled to the detector to receive the range signal from the detector. The oscillation determiner may determine that the rectifier is in an oscillation mode or is not in an oscillation mode. The oscillation mode can be determined based on the range signal.

The receiver includes a rectifier and a detector coupled to the rectifier. The detector may monitor a current and a voltage of the rectifier. The receiver further includes an oscillation determiner coupled to the detector and to receive the monitored values of voltage and current of the rectifier. The oscillation determiner may determine an oscillation state of the rectifier and in response to the determination may generate one or more power adjustment signals. The power adjustment signals to be used by the transmitter for stopping an oscillation of the rectifier.

In some embodiments, a method of oscillation control of a receiver of a wireless power system is provided. The method includes repeating the steps of: i) monitoring an oscillation state of the receiver and ii) in response to determining the receiver is oscillating, transmitting a power adjustment signal to request increasing the power received by the receiver, until determining the receiver stops oscillating. The method further includes: in response to determining the receiver is not oscillating, repeating the steps of: i) transmitting a power adjustment signal to request decreasing the power received by the receiver; and ii) monitoring an oscillation state of the receiver, until the receiver starts oscillating. The method further includes identifying the power transmitted to the receiver when the receiver starts oscillating as an oscillation threshold of the receiver and transmitting a power adjustment signal to request increasing the power received by the receiver by a predefined headroom. The predefined headroom may move the oscillation state of the receiver away from the oscillation threshold into the non-oscillating state. The method also includes waiting for a predetermined amount of time for stabilizing the receiver.

Additional aspects, features, and advantages of the present disclosure will become apparent from the following detailed description.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
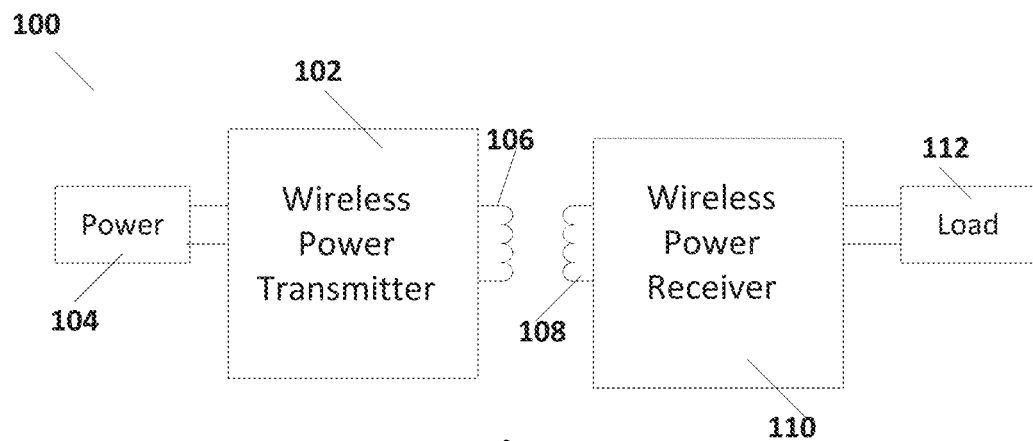
FIG. 1 illustrates a wireless power transmission system.

FIG. 1 illustrates a system 100 for wireless transfer of power. As illustrated in FIG. 1, a wireless power transmitter 102 drives a coil 106 to produce a magnetic field. A power supply 104 provides power to wireless power transmitter 102. Power supply 104 can be, for example, a battery based supply or may be powered by alternating current, for example 120V at 60 Hz. Wireless power transmitter 102 drives coil 106 at, typically, a range of frequencies, typically according to one of the wireless power standards.

There are multiple standards for wireless transmission of power, including the Alliance for Wireless Power (A4WP) standard and the Wireless Power Consortium standard, the Qi Standard. Under the A4WP standard, for example, up to 50 watts of power can be inductively transmitted to multiple charging devices in the vicinity of coil 106 at a power transmission frequency of around 6.78 MHz. Under the Wireless Power Consortium, the Qi specification, a resonant inductive coupling system is utilized to charge a device near the resonance frequency of the device. In the Qi standard, coil 108 is placed in close proximity with coil 106 while in the A4WP standard, coil 108 is placed near coil 106 along with other coils that belong to other charging devices. FIG. 1 depicts a generalized wireless power system 100 that operates under any of these standards.

As is further illustrated in FIG. 1, the magnetic field produced by coil 106 induces a current in coil 108, which results in power being received in a receiver 110. Receiver 110 receives the power from coil 108 and provides power to a load 112, which may be a battery charger and/or other components of a mobile device. Receiver 110 typically includes rectification to convert the received AC power to DC power for load 112.

Figure 2:
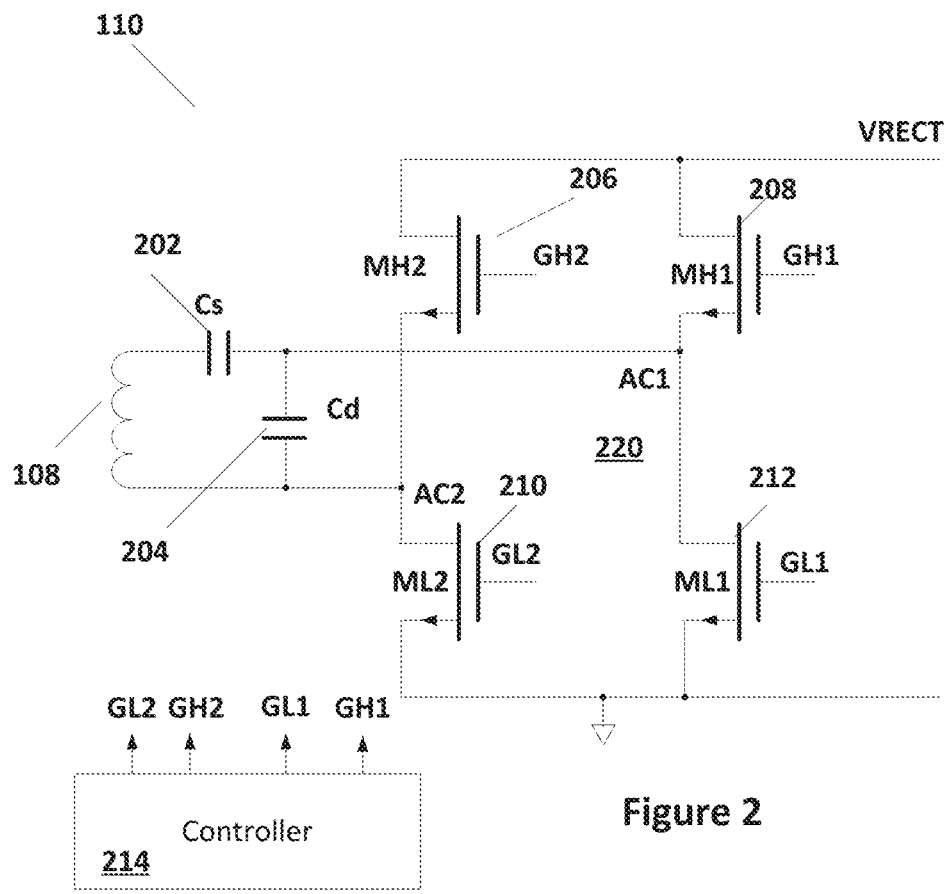
FIG. 2 illustrates a receiver of a wireless power transmission system that can be used in the transmission system illustrated in FIG. 1.

FIG. 2 illustrates an example of a portion of receiver 110 illustrated in FIG. 1. As shown in FIG. 2, coil 108 is coupled through capacitor 202 and capacitor 204 to a full-bridge rectifier circuit 220 formed by metal oxide semiconductor field effect transistors (MOSFETs) 206, 208, 210, and 212. AC power, illustrated as AC1 and AC2, received by coil 108 is rectified in the rectifier 220 to generate rectifier voltage Vrect. The gates of transistors 206, 208, 210 and 212, labeled GH2, GH1, GL2, and GL1, respectively, are driven by a controller 214. Controller 214 can drive the gates of transistors 206, 208, 210, and 212 to optimize the delivery of power at coil 108 and the transfer of rectified power to load 112. In some embodiments, the output from rectifier 220, the voltage labeled Vrect in FIG. 2, may be further filtered and processed prior to assertion across load 112. Vrect can be placed on a power line while transistors 210 and 212 are coupled to a ground line. One skilled in the art will recognize that, although a full-bridge rectifier 220 is illustrated in FIG. 2, other embodiments may include a half-bridge rectifier. Further, rectifier 220 may be formed completely or partially of diodes instead of controlled transistors such as transistors 206, 208, 210, and 212.

Some embodiments of the present invention are illustrated using the components of receiver 110. One skilled in the art will recognize how other receivers can be modified to provide further embodiments of the invention. For example, receiver 110 may further include a DC-DC voltage regulator receiving voltage Vrect from the rectifier and providing power to load 112.

The example of receiver 110 illustrated in FIG. 2 may be appropriate for a single standard of wireless power transmission. In general, each standard requires that coil 108 meet specifications specific to that standard. Embodiments of the present invention allow for operation with different standards, for example, a first standard may operate at 6.78 MHz and a second standard may operate at less than 200 KHz. No matter which standard is used or even when a multimode device implementing multiple standards is used, embodiments presented herewith can be used to stop oscillation of the receiver.

In some embodiments, small voltage differences between Vrect and the output voltage (needed for optimal efficiency), the communication pulses, and load variations may cause the system to settle at a point where Vrect oscillates in voltage due to current flow direction through the rectifier and voltage changes on the Rx LC tank that need to be corrected.

In some embodiments, the wireless power system may oscillate during operation at different load levels based on alignment and other system parameters (such as resonance values and Rx coil impedance), load steps, rising or falling loads. The oscillations may be considered as output instability and may reduce system efficiency or have any other negative side effects or may have little impact other than being an undesired oscillation.

The oscillations of the receiver can be prevented and the receiver can be stabilized by increasing the rectifier voltage which can result in loss of efficiency. Also, the receiver can be stabilized by using resonance capacitors with higher values and appropriate receiver coils to dampen the oscillations, which can however cause efficiency loss at some levels.

In accordance with some embodiments, a technique to stop the oscillations of the wireless power system while keeping efficiency high is introduced. When oscillation is detected, transmitter power can be increased, increasing Vrect, until the oscillation goes away. In some embodiments, Vrect can then be slowly reduced until oscillation returns, saving the setpoint where oscillation appears, then increased again to above the setpoint. In some embodiments, a headroom can be set by setting the voltage Vrect to a headroom voltage above the setpoint.

In some examples, when the load current changes, the Vrect target again may change and, if oscillation returns, the control loop can adjust for the oscillations at a new set-point. However, if the oscillations do not appear, the power transmission level may not change and Vrect may be left as it was.

Figure 3:
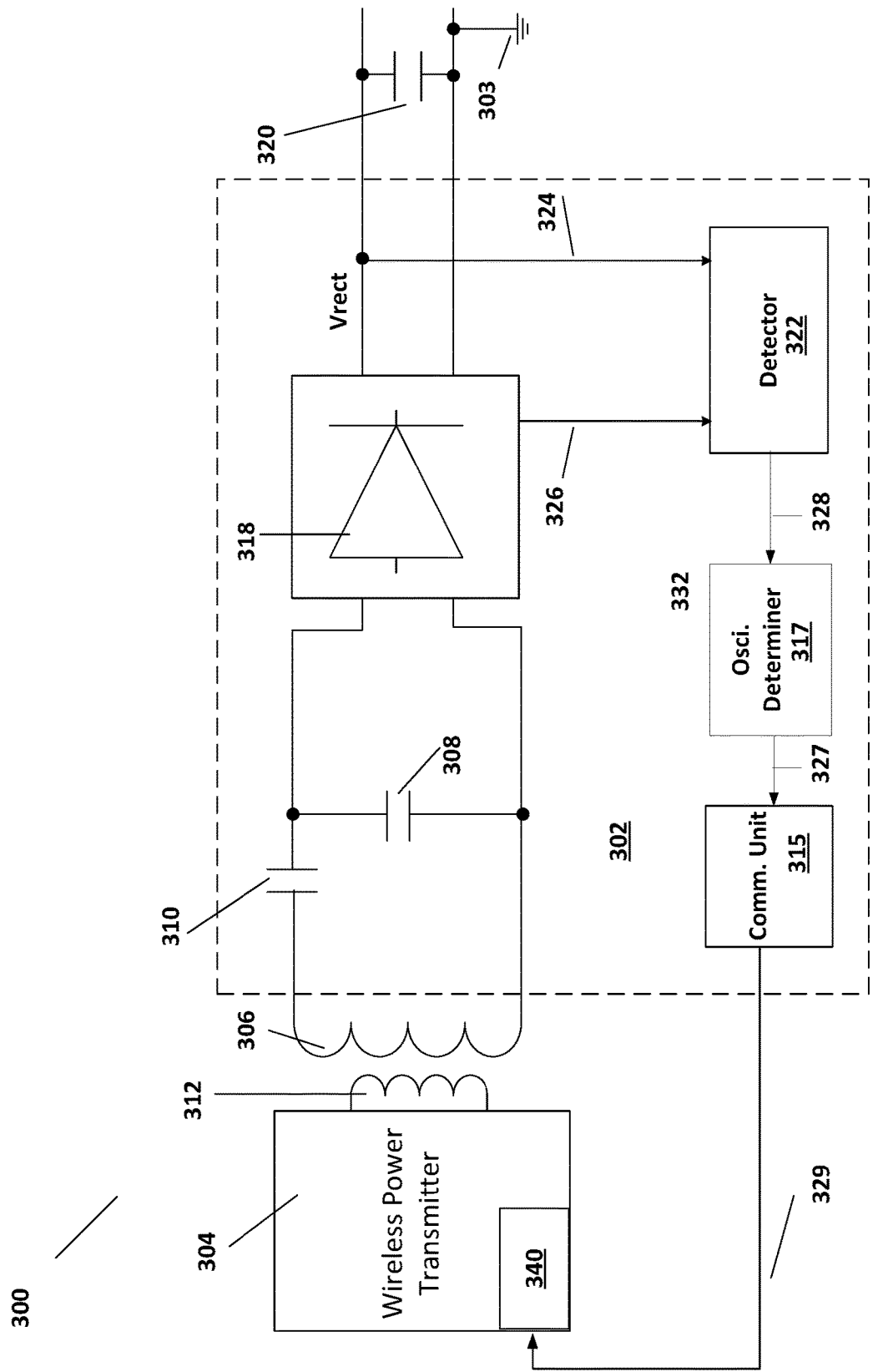
FIG. 3 illustrates a wireless power transmission system according to some embodiments that includes an oscillation determiner.

FIG. 3 illustrates a wireless power transmission system 300 according to some embodiments. Wireless transmission system 300 that includes a detector 322 And an oscillation determiner 317. As shown in system 300, a receiver circuit 302 receives the power from coil 306. The receiver 302 includes capacitor 310 and capacitor 308 that couple the coil 306 to a rectifier 318. As such, rectifier 318 receives power from the coil 306 and outputs rectifier voltage Vrect. Rectifier 318 may be a full-wave or half-wave rectifier. System 300 also includes a wireless power transmitter 304 that drives a coil 312 to produce a magnetic field that couples the coil 312 to the coil 306.

As is further illustrated in system 300, detector 322 is coupled through links 324 and 326 to the rectifier such that the detector 322 may receive the rectifier voltage Vrect signal through the link 324 and a current from rectifier 318 through link 326. In some embodiments, detector 322 receives one of the rectifier voltage Vrect or the rectifier current and in some embodiments detector 322 receives both the rectifier voltage Vrect and the rectifier current.

In some examples, rectifier 318 can be any rectifier. Rectifier 318 can be a full-wave rectifier, half-wave rectifier, and may be formed with diodes, transistors, or a combination of diodes and transistors. Further, rectifier 318 may be coupled to a power circuit that produces filtering and DC-DC conversion circuits in order to produce the circuit output voltage Vout.

In some embodiments, the rectifier 318 is consistent with the rectifier 220 of FIG. 2 that also includes the controller 214 and the rectifier current associated with the rectifier is a current of one of the transistors (MOSFETs) 206, 208, 210, and 212. In some examples, a capacitor 320 can be coupled between Vrect and ground 303.

In some embodiments, detector 322 monitors the received rectifier voltage signal and the rectifier current signal through the links 324 and 326 to monitor the rectifier voltage and/or the rectifier current. Detector 322 determines whether a monitor voltage (the rectifier voltage Vrect or a voltage indicating rectifier current) is swinging outside of a predefined range around a median value. Detector 322, in some embodiments, may generate a signal indicating each time the monitored value or values is outside the predefined range.

System 300 further includes an oscillation determiner 317. In some examples, the oscillation determiner 317 is coupled through a link 328 to the detector 322 and receives signals from detector 322 that indicates whether the monitored voltage is outside the predefined range. In some examples, the oscillation determiner 317 determines whether the rectifier 318 is oscillating. An example of the operation of the oscillation determiner 317 with detector 322 is described in more details with respect to FIG. 4A. In some examples, the oscillation determiner 317 sets the oscillation state of the rectifier as non-oscillating when it identifies that neither the rectifier voltage signal nor the rectifier current signal is oscillating. In some examples, the oscillation determiner 317 sets the oscillation state of the rectifier to oscillating when it identifies an oscillation on one of the rectifier voltage signal or the rectifier current signal.

In some embodiments, the oscillation of the rectifier voltage signal is determined by the oscillation determiner 317 when the rectifier voltage swings outside of a voltage interval around Vrect of greater than the predetermined value for a predetermined number of times in a particular interval of time. An oscillation in voltage or current of the rectifier is illustrated with respect to FIG. 4B. In some examples, the voltage interval can be at least 50 millivolts, the predetermined number of times can be at least 10 times, and the particular interval of time is at most 1 second. In some examples, if the Vrect voltage is attempted to be programmed to 5.25V, but the oscillation detector determines that the voltage is varying from 5.35 V to 5.15 V at a repetitive frequency, which could be a frequency other than the operating frequency of the wireless power system or any other repetitive interval of time, the oscillation detector will signal the processor that an oscillation is detected due to the target Vrect voltage exceeding the ±50 mV allowable threshold.

In some embodiments, the oscillation of the rectifier current signal is determined by the oscillation determiner 317 when the rectifier current swings outside of a current interval of greater than a predetermined current for another predetermined number of times in another particular interval of time. In some examples, the current interval can be at least 20 milliamps, the predetermined number of times is at least 5 times, and the particular interval of times is at most 1 second. In some examples, in stable operation, the output current should be equal to the current associated with Vrect to within ±10 mA. In some examples, if the 'LOAD output current' is currently 250 mA and then if the Vrect sensed current is different from the 'LOAD output current' by +25 mA and then by −25 mA and repeating; the oscillation detector determines that the Vrect current is varying from 275 mA to 225 mA at repetitive frequency, which can be a frequency other than the operating frequency of the wireless power system or any other repetitive interval of time, the oscillation detector will signal the processor that an oscillation is detected due to the 'LOAD output current' being constant to within allowable 20 mA while the Vrect current is exceeding the ±20 mA allowable threshold.

System 300 further includes a communication unit 315 coupled to oscillation determiner 317. In some examples, the communication unit 315 is coupled through a link 327 to the oscillation determiner 317 and receives power adjustment signals from the oscillation determiner 317. In some examples, the communication unit 315 transmits the power adjustment signals through a link, which may be a communication channel 329, to the wireless power transmitter 304.

In some examples, the wireless link 329 can be a wireless communication channel between the receiver 302 and the transmitter 304. For example, link 329 can be a wireless channel such as Bluetooth. In some embodiments, communication unit 315 may use the wireless power link, for example, data may be transmitted through the capacitive link between transmit coil 312 and receive coil 306. In some examples, the communication channel is an inductance link between a coil 306 of the receiver 302 and a coil 312 of the transmitter 304. The controller 340 of the transmitter 304 receives the power adjustment signals via the coil 312 of the transmitter 304. In some embodiments, data may be transmitted by modification of the magnetic coupling between transmit coil 312 and receive coil 306. In some examples, communications can be affected using the capacitive coupling between coils 312 and 306 so as not to use the magnetic coupling channel.

In some embodiments, the wireless power transmitter 304 includes a controller 340 that receives the power adjustment signals through the wireless link 329. The power adjustment signals from the receiver may request the transmitter to adjust a level of power transmitted from the transmitter. In some examples, the wireless power transmitter 304 adjusts the power transmitted to the coil 312 based on the received power adjustment signals. In some examples, the wireless power transmitter 304 increases the power transmitted to the coil 312 and thus increases the power received by the receiver coil 306 which in return increases the rectifier voltage Vrect. In some other examples, the wireless power transmitter 304 decreases the power transmitted to the coil 312 and thus decreases the power received by the receiver coil 306 which in return decreases the rectifier voltage Vrect.

The increase or decrease of the voltage supplied to rectifier 318 modifies the oscillation state of the rectifier 318 between oscillating and non-oscillating. In some examples, the power adjustment signal may include an indication to increase or decrease the power transmission level from the transmitter to the receiver by step functions of a predefined amount. In some examples, the power adjustment signal may include an amount the power transmission level from the transmitter to the receiver may be increases or decreased.

Figure 5:
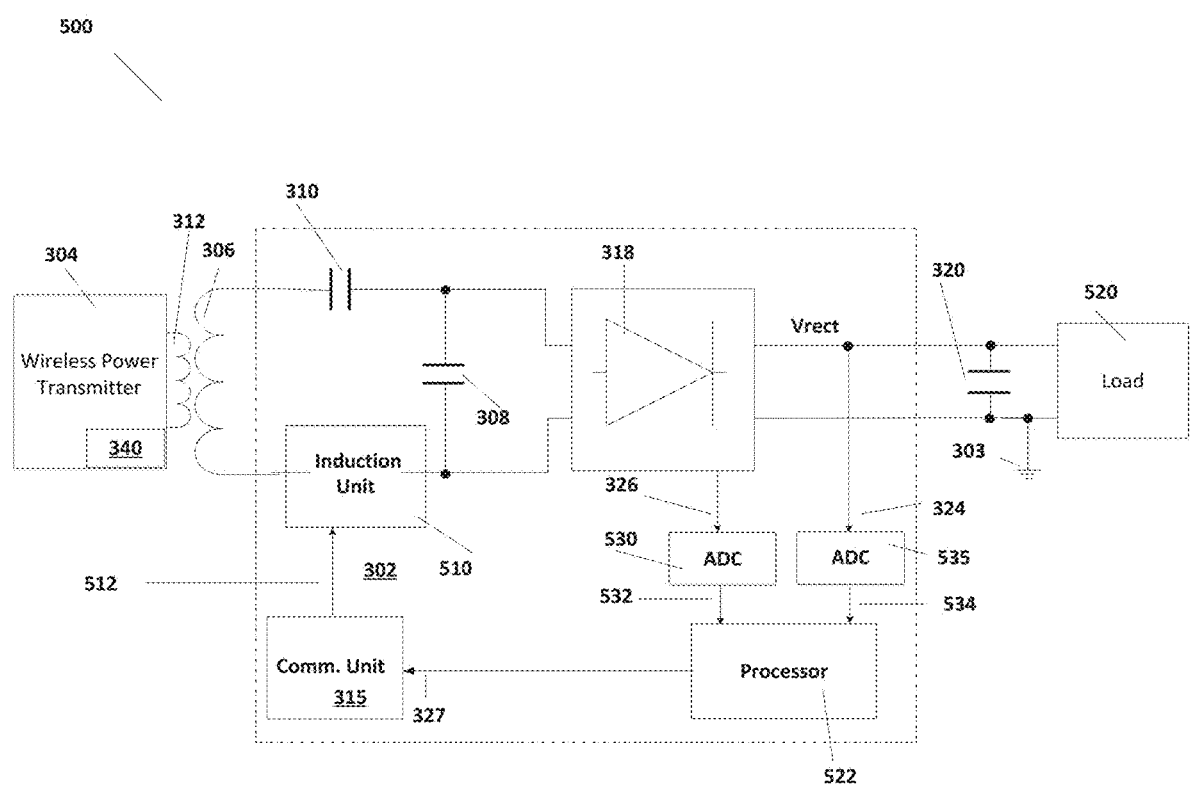
FIG. 5 illustrates a wireless power transmission system according to some embodiments that includes a processor for oscillation determination.

FIG. 5 illustrates a wireless power transmission system 500 according to some embodiments. In system 500, the functions of detector 322 and oscillation determiner 317 are formed by a processor 522. Processor 522 can be any processor system that can execute instructions. Processor 522 may include both volatile and non-volatile memory as well as micro-computers or other processing devices. In general, processor 522 can execute instructions stored in its memory.

As shown in FIG. 5, receiver 302 includes a first analog-to-digital converter (ADC) 535 coupled through the link 324 to the rectifier 318 a second ADC 530 coupled through the link 326 to the rectifier 318. Processor 522 is coupled to the first and the second ADC through the links 534 and 532 respectively. In some examples, the detector 522 together with the ADCs 530 and 535 may perform the functionality of both detector 322 and oscillation determination 317 of FIG. 3.

In some examples, the ADC 535 receives the rectifier voltage signal through the link 324, digitizes the rectifier voltage and sends the digitized rectifier voltage through the link 534 to the processor 522. Also, the ADC 530 receives the rectifier current signal through the link 326, digitizes the rectifier current and sends the digitized rectifier current through the link 532 to the processor 522. In some examples, the processor 522 may receive one of the monitored signals, the quantized rectifier voltage or rectifier current. In some examples, the processor received both of the monitored signals.

In some examples, the processor 522 constantly monitors the received digitized rectifier current and the digitized rectifier voltage and determines whether the monitored signals are oscillating. If the processor 522 determines an oscillation, the processor 522 provides a power adjustment signal through the link 327 to the communication unit 315. In some examples, the processor determines an oscillation by identifying the number of times the monitored signals have crossed a threshold.

Figure 4A:
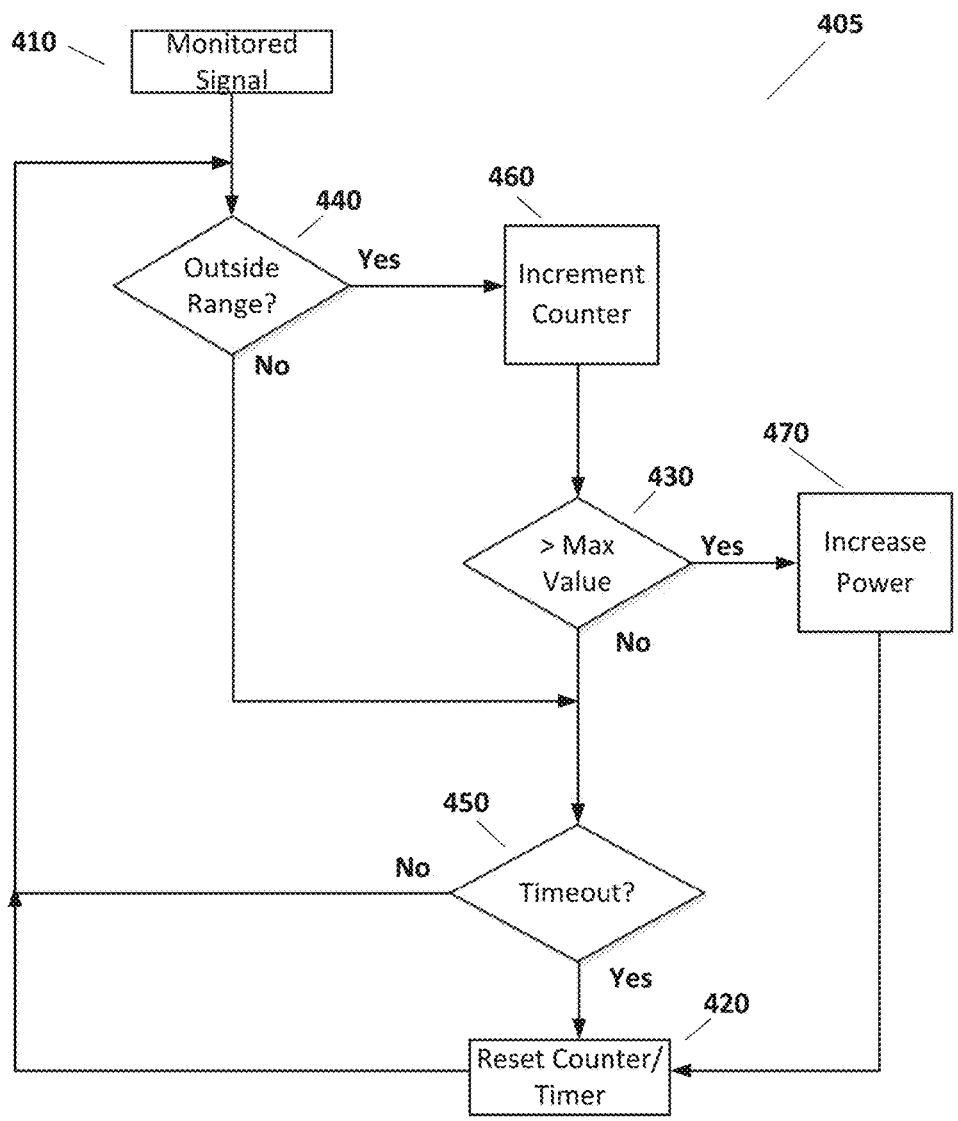
FIG. 4A illustrates an oscillation detector and a determination unit of a receiver of a wireless power transmission system according to some embodiments.
Figure 4B:
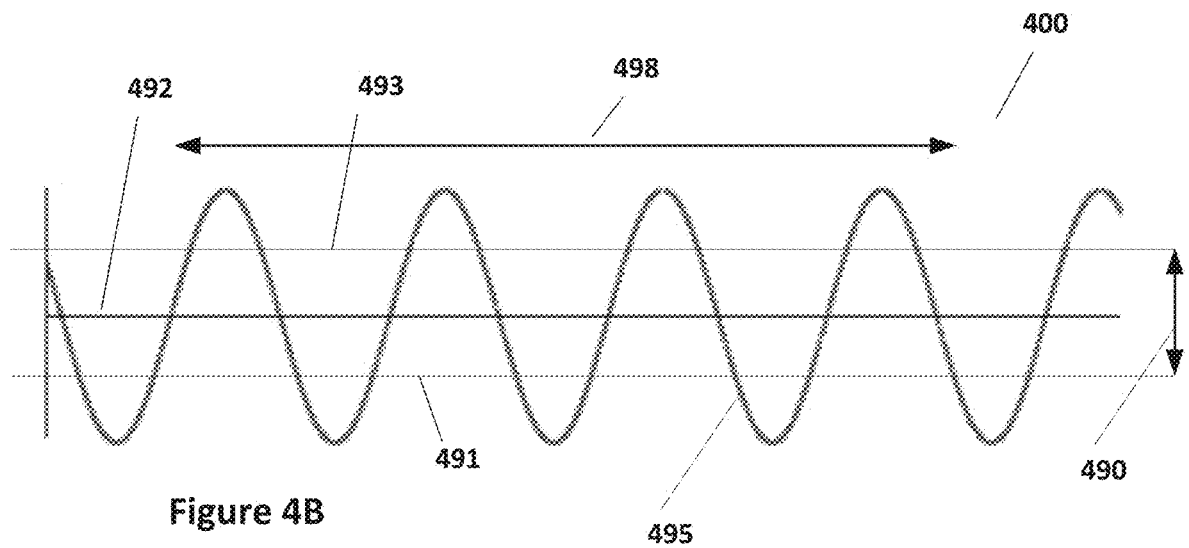
FIG. 4B illustrates an oscillation example in a voltage or a current of a rectifier of the receiver.

FIG. 4A illustrates an algorithm 405 that may be performed by detector 322 and oscillation determiner 317 or by processor 522. In step 410, a monitored signal, which may be the rectifier voltage Vrect and/or the rectifier current, is received. In step 440, which may be performed by detector 322, algorithm 405 determines whether the monitored signal is outside of a predetermined range. The determination of being outside the predetermined range is illustrated with respect to FIG. 4B. As illustrated in FIG. 4B, monitored signal 495 varies around a mean value 492. Step 440 determines that monitored signal 495 is outside the predetermined range 490 if its maximum and minimum value lies outside of the predetermined range 490.

If algorithm 440 determines, in step 440, that the monitored signal 495 is outside the predetermined range 490, then a counter is incremented in increment counter step 460. In step 430, algorithm 405 determines whether or not the value of the counter incremented in step 460 is greater than a maximum value. Algorithm 405 determines that rectifier 318 is in an oscillation state when the number of the incremental counter exceeds a predetermined Max Value. As illustrated in FIG. 4A, if the Max Value is exceeded, then algorithm 405 proceeds to step 470 where a request to increase the power is transmitted to the transmitter, as discussed above. From step 470, algorithm 405 resets the counter in step 420 and returns to step 410.

If, in step 440, it is decided that the monitor signal is not outside the predetermined range or, in step 430, it is decided that the counter has not exceeded the Max Value, the algorithm 405 proceeds to step 450. In step 450, algorithm 405 determines whether a set amount of time has passed. If the set amount of time has passed, then the counter and timer are reset in step 420 and algorithm 405 returns to step 410. If the set amount of time has not passed, then algorithm 405 returns to step 410.

In this fashion, receiver 302 in system 300 or system 500 determines whether rectifier 318 is in an oscillating state or not in an oscillating state. If, as illustrated in algorithm 405, receiver 302 determines that an oscillating state exists, then receiver 302 can request transmitter 304 to increase its power output in order to increase the rectifier voltage Vrect until receiver 302 determines that it is in a not oscillating state.

FIG. 4B illustrates an oscillation example in the monitored signal, which as discussed above may be the rectifier voltage Vrect or the rectifier current of rectifier 318 of receiver 302. The graph 400 shows an oscillation 495 around a median value 492. In some examples, when the rectifier voltage Vrect 492 swings outside of a voltage interval around median Vrect 492 that exceeds a predetermined range 490 for a predetermined number of times in a particular interval of time 498, then step 440 of algorithm 405 determines that rectifier 318 is oscillating. In another example, when the rectifier current 492 swings outside of a current interval 492 of greater than a predetermined value 490 for a predetermined number of times in a particular interval of time 498, then step 440 of algorithm 405 determines that rectifier 318 may be oscillating. In some examples, it is determined that the monitored signal of rectifier 318 are outside a predetermined range 490 when the monitored system cross both the lower and the upper thresholds 491 and 493 respectively for a predetermined number of times within a predetermined time frame. The predetermined number of times can be any number, for example a number in the range of 3 to 10, while the predetermined time frame may be up to several seconds; however, the determination can typically be made within 10 ms or by 25 times crossing the threshold range. In some examples, the value 492 is an average of the monitored signal or is a programmed target value and the range 490 is defined around the value 492.

In some examples, the monitored signal of rectifier 318 may change over time, and the median may drift. The changes can be considered oscillation when they follow an oscillation pattern as described above. For example, if the current or voltage of the rectifier changes with a detectable frequency and a particular amplitude, then it can be considered an oscillation. In another example, since noise exists, small changes do not qualify as oscillation and the changes may have recognizable and repetitive amplitudes to be recognized as oscillation. Thus, the oscillations may have a frequency and amplitude that are defined in predefined ranges.

Referring back to FIG. 5, system 500 may further include an induction unit 510 coupled to the communication unit 315. The communication unit 315 transmits requests 512 for power adjustment, the power adjustment signals, through the induction unit 510, the receiver coil 306, and the transmitter coil 312 to the controller 340 of the wireless power transmitter 304. The induction unit 510 couples the power adjustment signal to the receiver coil 306 and then power adjustment signal is transmitted through the magnetic field that couples the coil 312 to the coil 306 to the transmitter 304 where the controller 340 may receive the power adjustment signal via a coupling to the coil 312. In some examples, the induction unit 510 couples the power adjustment signal through a separate coil to the receiver coil 306. In some other examples, the induction unit 510 induces a current change in the receiver coil 306 at a frequency distinct from the frequency of the operation of the wireless power system. In some examples, a load 520 is coupled between the output of the rectifier Vrect and the ground 303. In some examples, other communication methods may also be employed, such as Bluetooth communication signals.

Referring back to FIG. 3, in some examples, the wireless power system 300 may include the induction unit 510 coupled to the receiver coil 306 such that the communication unit 315 may transmit the power adjustment signal through the induction unit 510, the receiver coil 306, and the transmitter coil 312 to the wireless power transmitter 304.

FIGS. 6A, 6B, 8A, 8B, 9A, 9B, 10A, and 10B, that are each associated with some embodiments are described below. The figures show some oscillation examples and the examples of applying the systems 300 of FIG. 3 or system 500 of FIG. 5 to control the oscillations.

Figure 6A:
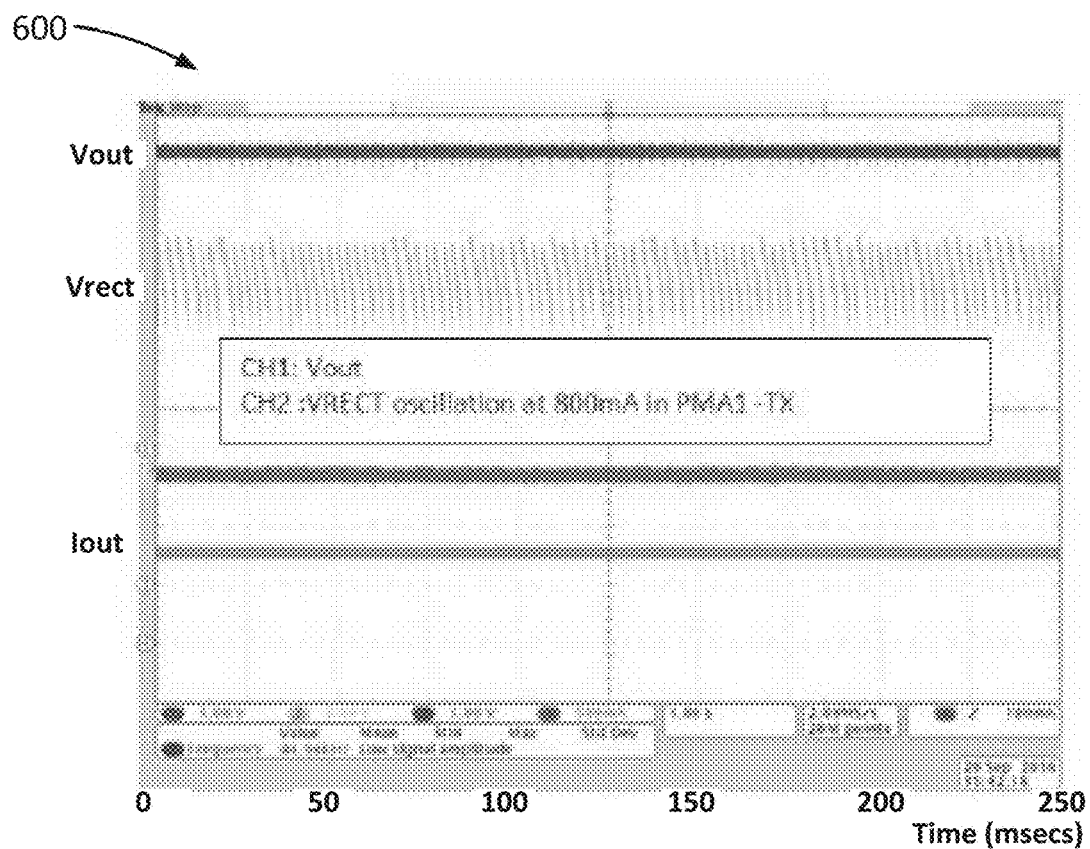
FIG. 6A illustrate measurement results during operation of the wireless power transmission system according to some embodiments that does not include oscillation control.

FIG. 6A illustrates measurement results during operation of an example wireless power transmission system that does not include oscillation control. As shown in the graph 600, the rectifier voltage Vrect oscillates when output current Tout is essentially fixed. Also, the graph 600 shows that output voltage of the receiver includes effects, e.g., traces, of these oscillations.

Figure 6B:
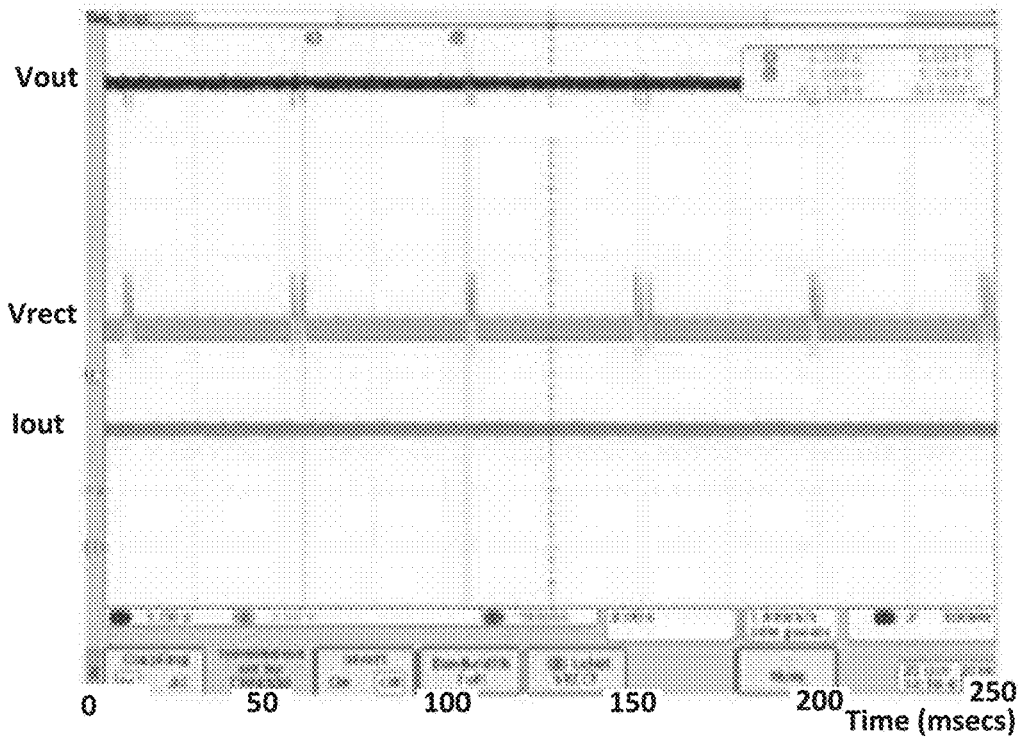
FIG. 6B illustrate measurement results during operation of the wireless power transmission system according to some embodiments that includes oscillation control.

FIG. 6B illustrates measurement results during operation of the wireless power transmission system according to some embodiments that includes oscillation control. As shown in the graph 650, the rectifier voltage Vrect oscillates for short intervals of time until the oscillation is stopped. As shown the output current Tout is essentially fixed. Also, the graph shows that output voltage of the receiver includes effects, e.g., traces, of the oscillations in the same short intervals of time until the oscillation control stops the oscillations.

Figure 8A:
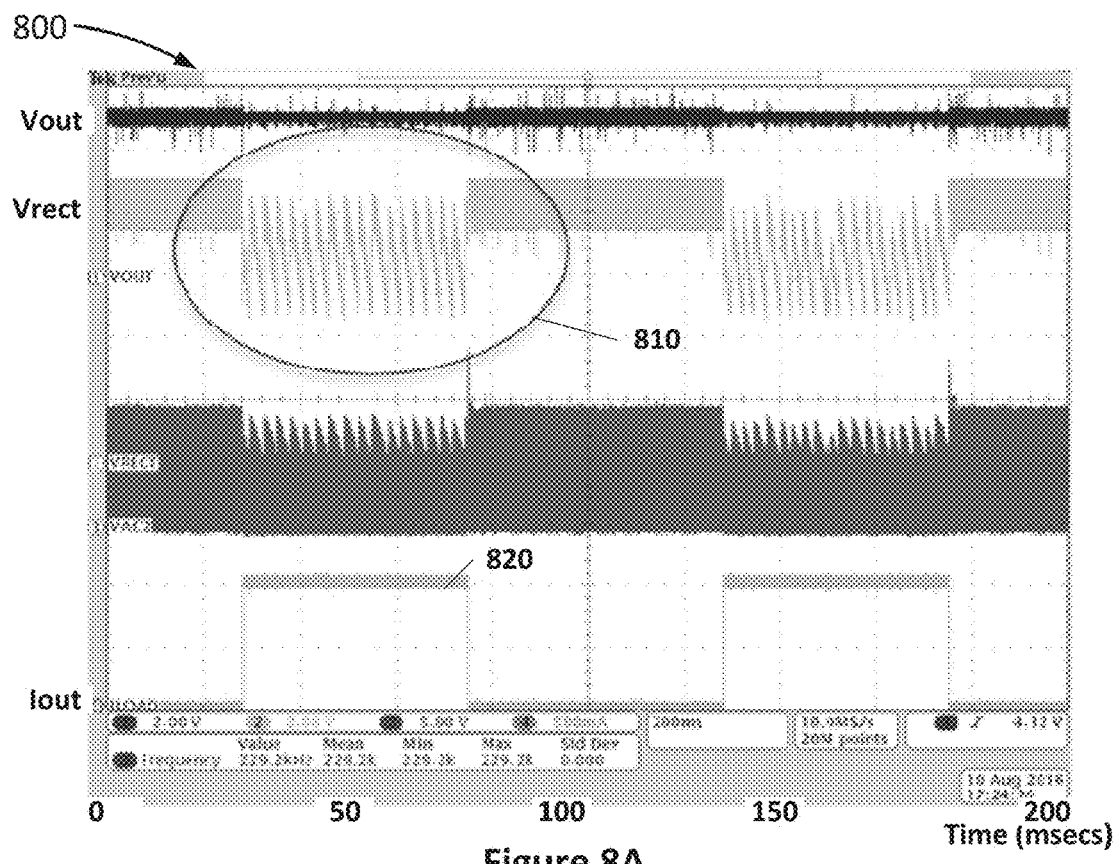
FIG. 8A illustrate measurement results during operation of the wireless power transmission system according to some embodiments that does not include oscillation control.

FIG. 8A illustrates measurement results during operation of the wireless power transmission system according to some embodiments that does not include oscillation control. As shown in the graph 800, the rectifier voltage Vrect oscillates. Also, the graph shows that output voltage Vout of the receiver may include effects, e.g., traces, of these oscillations. As shown, in some examples, the oscillations 810 begin when the output current Iout 820 jumps up.

Figure 8B:
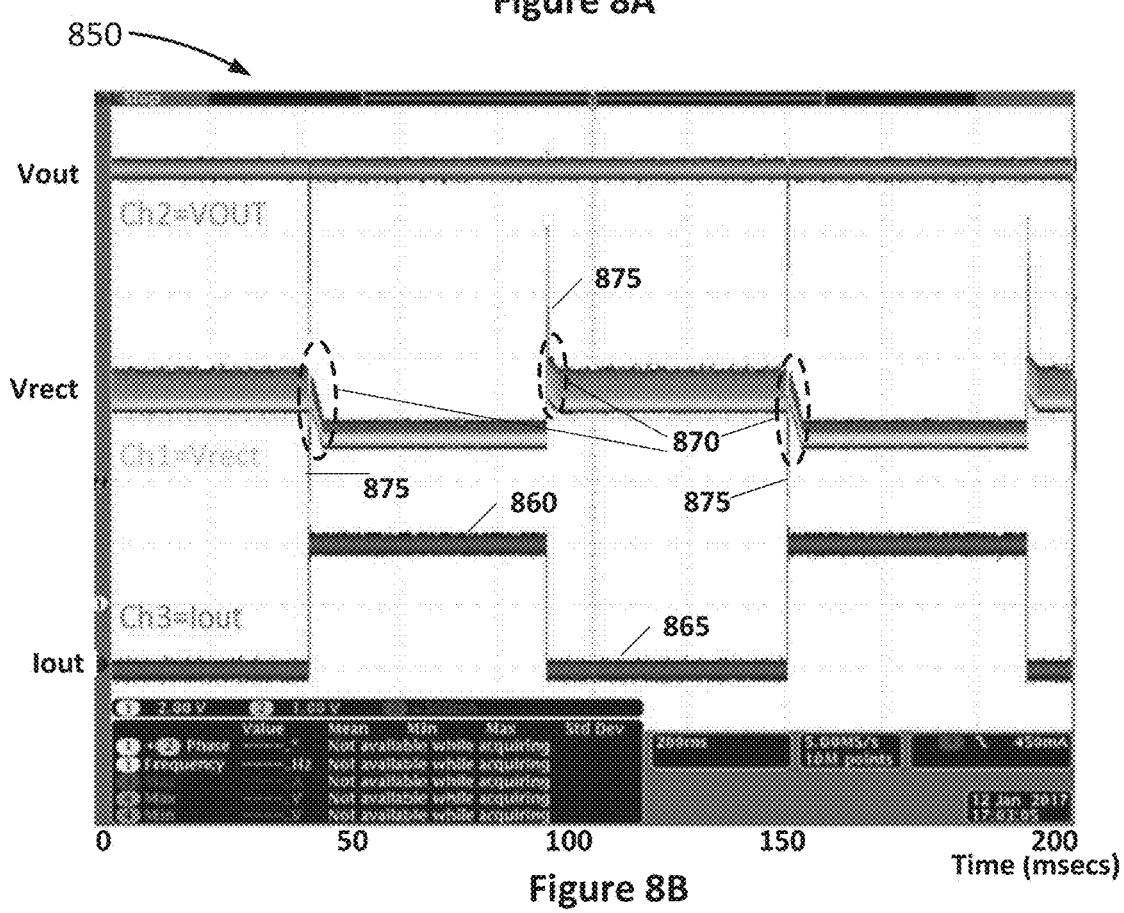
FIG. 8B illustrate measurement results during operation of the wireless power transmission system according to some embodiments that includes oscillation control.

FIG. 8B illustrates measurement results during operation of the wireless power transmission system according to some embodiments that includes oscillation control. As shown in the graph 850, the rectifier voltage Vrect oscillates for short intervals of time until the oscillation is stopped. Also, the graph 850 shows that output voltage Vout of the receiver may include effects, e.g., traces, of these oscillations. As shown, in some examples, a slow ramp may occur for a short interval 870 when the output (load) current Iout 860 jumps up or Iout 865 jumps down and then stops due to implementing the oscillation control. In some examples, an upward or a downward sharp jumps 875 may occur before the slow ramp 870.

Figure 9A:
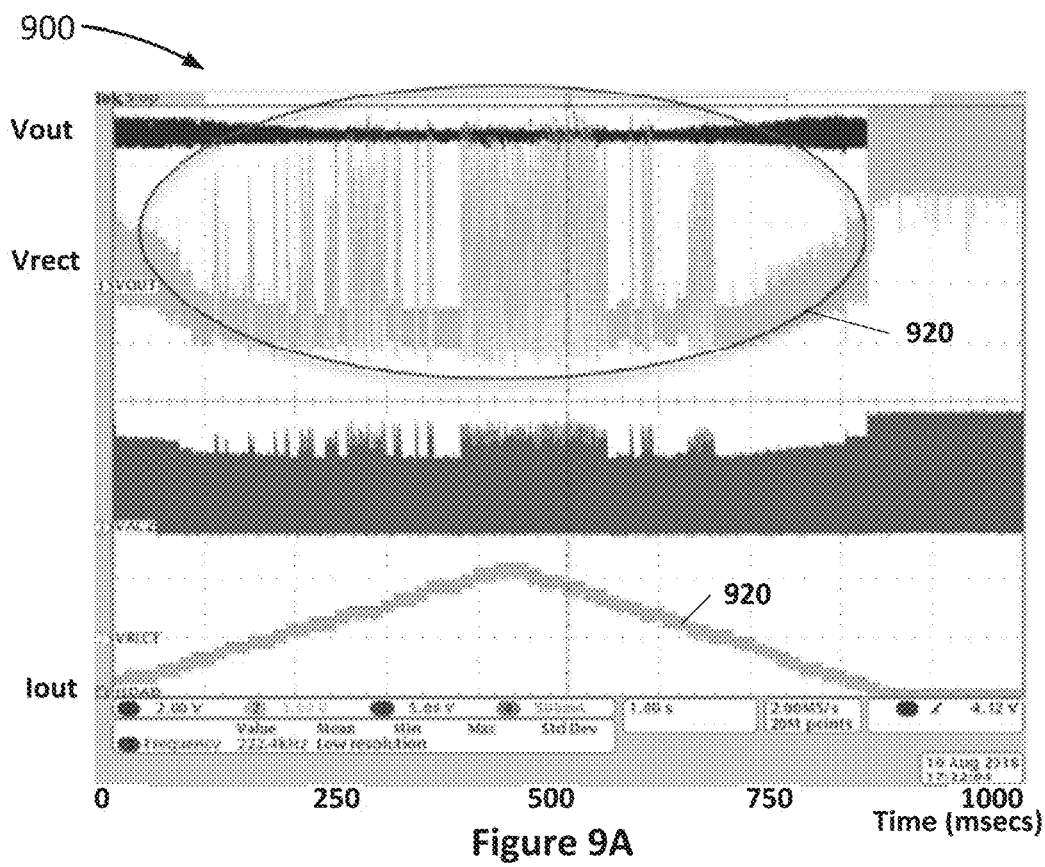
FIG. 9A illustrate measurement results during operation of the wireless power transmission system according to some embodiments that does not include oscillation control.

FIG. 9A illustrates measurement results during operation of the wireless power transmission system according to some embodiments that does not include oscillation control. As shown in the graph 900, the rectifier voltage Vrect oscillates in multiple places 920 when the output current Tout 920 gradually changes, e.g., in 10 seconds, from 0 amp to 1 amp then back to 0 amp. Also, the graph shows that output voltage Vout of the receiver may include effects, e.g., traces, of these oscillations.

Figure 9B:
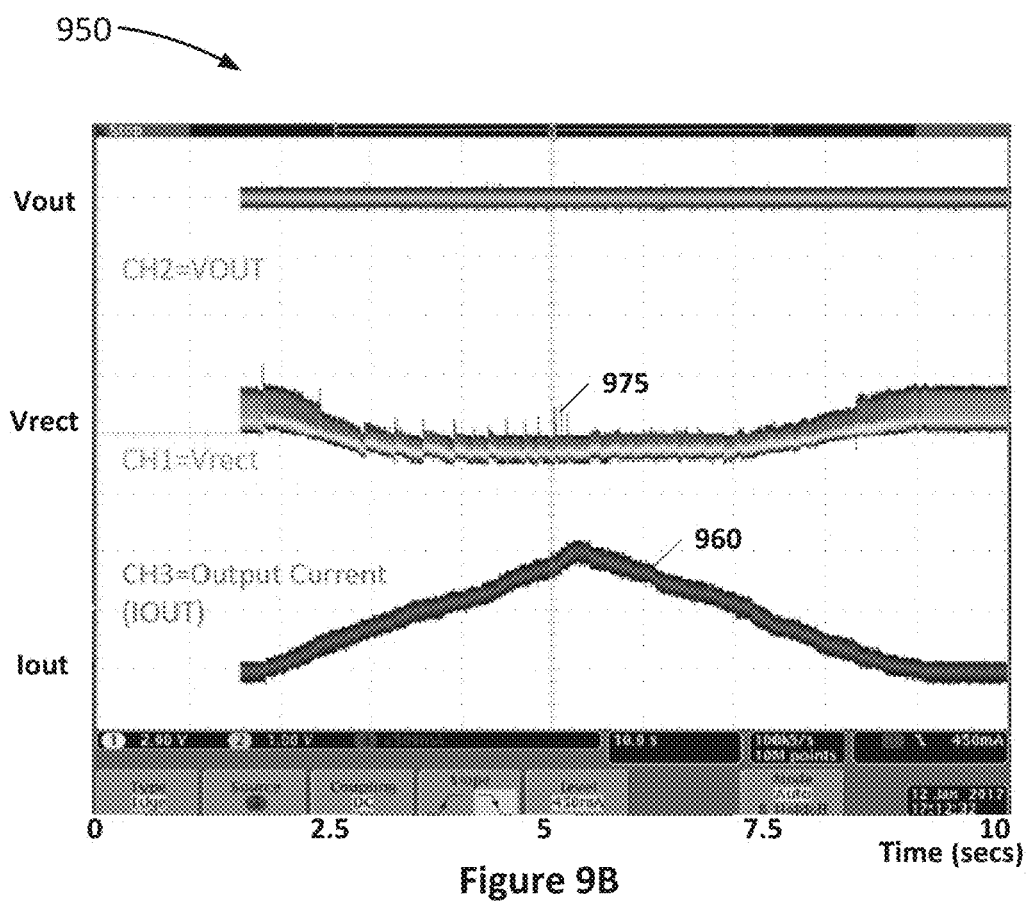
FIG. 9B illustrate measurement results during operation of the wireless power transmission system according to some embodiments that includes oscillation control.

FIG. 9B illustrates measurement results during operation of the wireless power transmission system according to some embodiments that includes oscillation control. As shown in the graph 950, when the output current Iout 960 gradually changes, e.g., in 10 seconds, from 0 amp to 1 amp then back to 0 amp, the rectifier voltage Vrect shows a more stabilized behavior because it may oscillate in multiple places for very short intervals of time 975 and then stops. Also, the graph 950 may not show effects, e.g., traces, of these oscillations in the output voltage Vout.

Figure 10A:
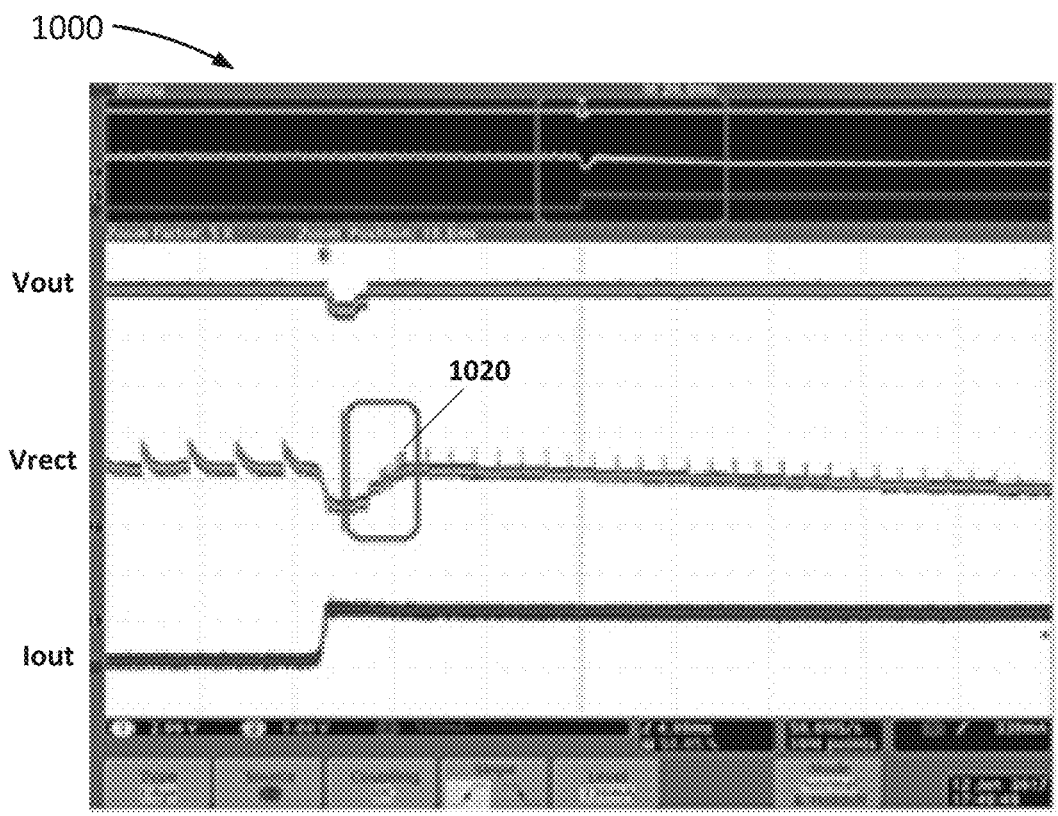
FIG. 10A illustrate measurement results during operation of the wireless power transmission system according to some embodiments that includes oscillation control.

FIG. 10A illustrates measurement results during operation of the wireless power transmission system according to some embodiments that includes oscillation control. In some examples, as shown in the graph 1000, when the output current jumps up and the Vrect starts oscillating, the Vrect may be increased to stop the oscillations. In some examples, after stopping the oscillations at point 1020, the Vrect may slowly decrease. The slow decrease of Vrect may be caused by slow increase in output current, e.g., load current. In some other examples, the slow decrease in Vrect may be caused by decreasing the power transmission from transmitter and may be performed to find the oscillation threshold.

Figure 10B:
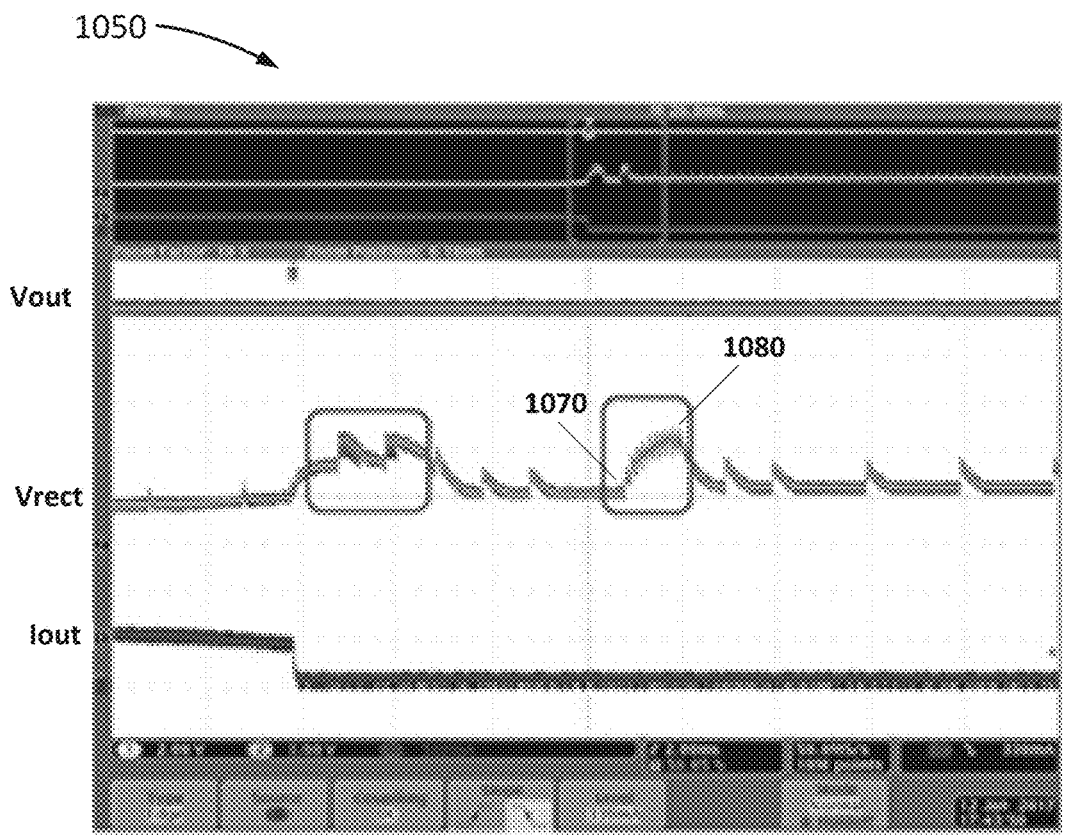
FIG. 10B illustrate measurement results during operation of the wireless power transmission system according to some embodiments that includes oscillation control.

FIG. 10B illustrates measurement results during operation of the wireless power transmission system according to some embodiments that includes oscillation control. In some examples, as shown in the graph 1050, when the output current jumps down the Vrect may starts oscillating at point 1070. Then Vrect may be increased to stop the oscillations at point 1080. In some examples, after stopping the oscillations at point 1080, the Vrect may slowly decrease. The slow decrease of Vrect may be caused by slow increase in output current, e.g., load current.

In some examples, when the receiver 302, and rectifier 318, are in an oscillating mode, the rectifier voltage Vrect can be increased above a threshold for onset of the oscillation mode of the rectifier/receiver in order to cause receiver 302 to transfer to a not oscillating mode. In some examples, the wireless power transmitter 304 increases the power transmitted to the coil 312 by a predefined amount, which provides for a headroom, above the threshold at which the rectifier stops oscillation to give a headroom for operation of the rectifier 318 above the oscillation threshold.

In some examples, adjusting the headroom and returning close to original value will cause enough system change to alter the set-point into a non-oscillating point, even when the new setting is very close to the original set-point that was oscillating.

In some other examples, increasing the headroom may cause continued oscillations such that it can be corrected once the headroom is adequate enough. In some examples, a headroom of +0.5V above an oscillating point may still show oscillation, so Vrect is increase up another, e.g., +0.25V (+0.75V total) to stop the oscillations. Then the headroom can be decreased, however, the system may not exhibit the oscillations at the previously oscillating point, for example, when reducing Vrect to regain lost efficiency (due to increased Vrect), Vrect may be reduced by 0.6V without introducing oscillations. In some examples, the oscillations may exhibit certain degrees of hysteresis and as such, one may not assume that lack of oscillation at an operating point, will always result in no oscillations at that specific operating point.

In some examples, when the receiver 302 is in a not-oscillating mode, the rectifier voltage Vrect can be decreased to determine the threshold at which the oscillation of the rectifier/receiver may start. In some other examples, the threshold is the oscillation threshold. In some examples, the wireless power transmitted to the coil 306 is increased by the predefined amount over an oscillation threshold value in order to create the headroom above the threshold at which rectifier 318 starts oscillation. In some examples, the wireless power transmitter 304 increases the power transmitted to the coil 312 by the predefined amount over the starting threshold voltage in order to create the headroom above the threshold to move the rectifier to non-oscillating mode.

Figure 7:
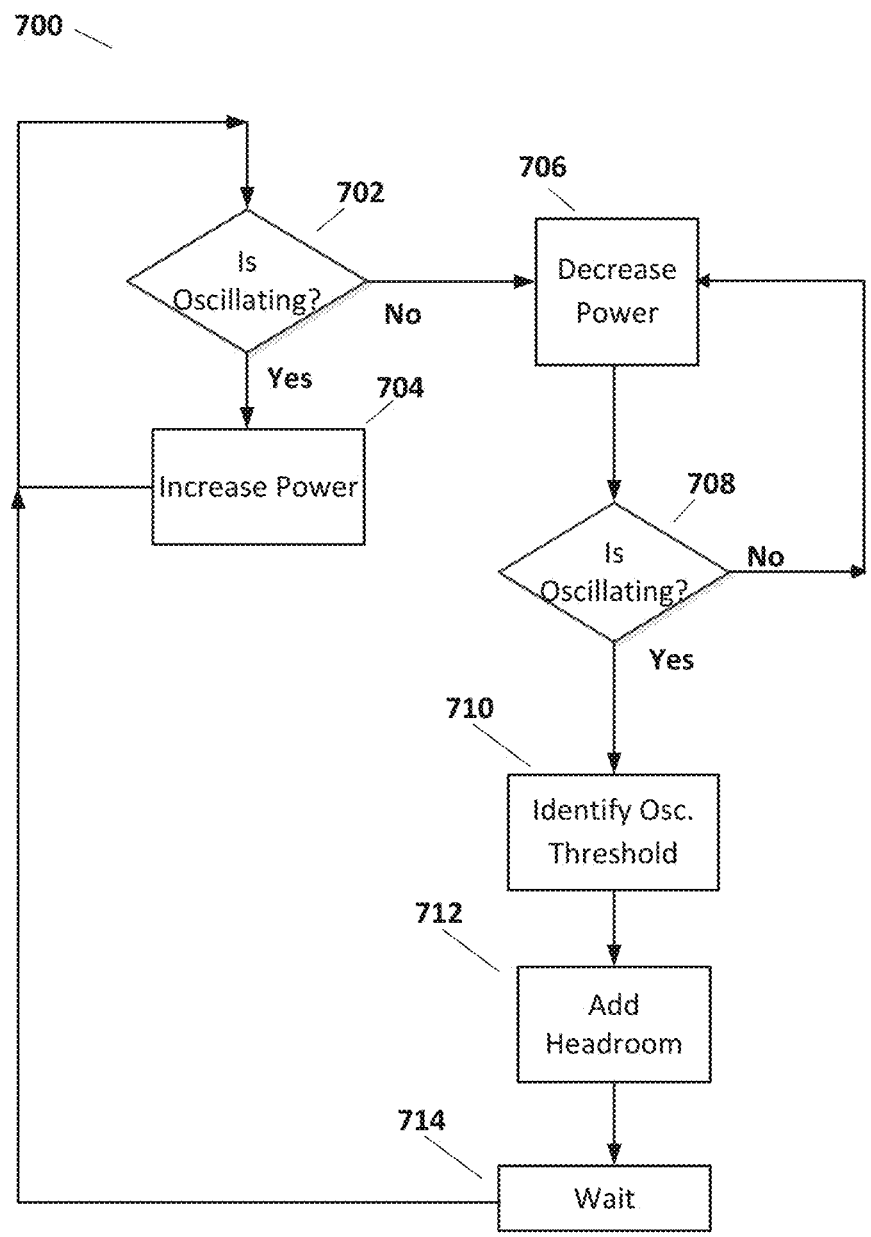
FIG. 7 is a flow diagram of a method of oscillation control of a receiver of a wireless power transmission system, according to aspects of the present disclosure.

FIG. 7 is a flow diagram of a method 700 of oscillation control of a receiver 302 of a wireless power transmission system, according to aspects of the present disclosure. It is understood that the steps of method 700 may be performed in a different order than shown in FIG. 7, additional steps can be provided before, during, and after the steps, and/or some of the steps described can be replaced or eliminated in other embodiments. The steps of method 700 can be considered as tasks and can be carried out by the power transmission systems 300 or 500 of FIGS. 3 and 5, respectively. In some examples, the steps of method 700 are performed in response to receiving the power adjustment signals indicating a receiver is oscillating.

At step 702, the method 700 includes monitoring an oscillation state of a receiver and to determine the oscillation state of a receiver as oscillating or non-oscillating. The determination can be performed by the oscillation determiner 317 shown in diagrams 300, or the processor 522 as shown in diagram 500, and according to aspects of algorithm 405 as illustrated FIG. 4A.

If, in step 702, an oscillating state is detected, then method 700 proceeds to step 704. At step 704, the method 700 includes generating a power adjustment signal to be transmitted to transmitter 304 to increase the power received by receiver 302. As described herein and shown in FIGS. 3 and 5, the power adjustment signals in step 704 are generated by the oscillation determiner 317 of the wireless power system 300 or the processor 522 of the wireless power system 500, as described above. The steps 702 and 704 may be repeated until the receiver is no longer oscillating.

In some examples, the oscillation state of the rectifier 318 of the receiver 302 is determined as oscillating when at least one of the current or voltage of the rectifier 318 is determined to be oscillating. In some examples, increasing the power transmission from the transmitter 304 to the receiver 302 increases the voltage of the rectifier 318 such that by increasing the rectifier voltage the rectifier 318 may stop oscillating.

When step 702 of method 700 determines that there is no oscillation, then method 700 proceeds to step 706. At step 706, the method 700 includes generating a power adjustment signal to decrease power transmission from transmitter 304 received by receiver 302. In some examples, the power adjustment signal to decrease power transmission to receiver 302 may be generated after the first instance the receiver/rectifier stops oscillation. In some embodiments the controller 340 of the transmitter 304 may receive the power adjustment signal and may command transmitter 304 to decrease power transmission. In some examples, the controller 340 may command the transmitter to gradually decrease the power transmission from the transmitter 304 to the receiver 302. In some examples, decreasing the power transmission from the transmitter 304 to the receiver 302 decreases the rectifier voltage Vrect of the rectifier 318 such that by decreasing the rectifier voltage the rectifier 318 may start oscillating.

At step 708, the method 700 includes monitoring the oscillation state of the receiver and to determine the oscillation state of receiver 302 as oscillating or non-oscillating. After sending a power adjustment signal to decrease the power transmission level, the oscillation determinations unit 317 or processor 522 may monitor the oscillation state of the receiver until a second instance that the oscillation state changes from non-oscillating to oscillating. In some examples, the steps 706 and 708 may repeat until the receiver starts oscillating. In some examples, the oscillating state of receiver 302 is continuously monitored. In some examples, the second instance that the oscillation state changes from non-oscillating to oscillating may be the oscillation threshold as discussed above.

In some other examples, the power transmission level from the transmitter 304 to receiver 302 is gradually increased or decreased such that the oscillation determinations unit 317 or the processor 522 can closely monitor the oscillation state of the receiver based on the power adjustment signals.

Once oscillation has begun as indicated in step 708, method 700 proceeds to step 710. At step 710, method 700 includes identifying the oscillation threshold according to the current power level of transmitter 304. In some examples the second instance when the receiver/rectifier starts oscillating is noted. The power transmission level received by receiver 304 at the second instance can be noted as the oscillation threshold of the receiver.

At step 712, the method 700 includes generating a power adjustment signal for the transmitter to increase power transmission level received by the receiver with a headroom according to the threshold value plus the predefined amount. In some examples, the oscillation threshold may not be stable and thus the power transmission level received by the receiver is slightly increased by the predefined amount to create the headroom above the threshold of oscillation into the non-oscillating state.

At step 714, the method 700 may include waiting for a predetermined amount of time until the receiver stabilizes. In some examples, the processor 522 or the oscillation determinations unit 317 may wait between 5 to 60 seconds, for example, 10 seconds such that the receiver stabilizes. At the end of the waiting period in step 714, method 700 returns to step 702 to repeat the above steps.

The above detailed description is provided to illustrate specific embodiments of the present invention and is not intended to be limiting. Numerous variations and modifications within the scope of the present invention are possible. The present invention is set forth in the following claims.

What is claimed is:

1. A wireless receiver, comprising:
   a rectifier configured to receive power from a receiver coil;
   a detector configured to receive a monitor signal from the rectifier and provide a range signal indicating whether the monitor signal is outside a predetermined range;
   an oscillation determiner configured to receive the range signal from the detector, the oscillation determiner is configured to determine whether a rectifier mode is an oscillation mode or is not in oscillation mode, to generate power-level adjustments for a wireless power transmitter that provides power to the receiver coil based on the rectifier mode, to determine a minimum operating power level below which the rectifier mode is in the oscillating mode by repeatedly providing power-level adjustments to reduce power until the rectifier mode is in the oscillation mode and identifying the minimum operating power level, and to determine an operating power level that is above the minimum operating power level; and
   a communication unit coupled to the oscillation determiner, the communication unit configured to communicate power-level adjustments to the wireless power transmitter.

2. The wireless receiver of claim 1, wherein the detector is configured to compare the received monitor signal against an upper threshold and a lower threshold, and wherein the range signal indicating the monitor signal is outside the predetermined range is provided when the monitor signal crosses both the upper threshold and the lower threshold.

3. The wireless receiver of claim 1, wherein the oscillation determiner is configured to determine the oscillation mode of the rectifier based on counting a number of times the range signal is outside the predetermined range.

4. The wireless receiver of claim 3, wherein the counting is in a predetermined interval of time.

5. The wireless receiver of claim 1, wherein the monitor signal is voltage or a current of the rectifier.

6. The wireless receiver of claim 1, wherein the communication unit transmits the power adjustment signal to request for increased power through a wireless communication channel whenever the rectifier mode is the oscillation mode.

7. The wireless receiver of claim 6, wherein the communication channel is an inductance link.

8. The system of claim 1, wherein in response to the oscillation determiner determining an oscillation mode, the oscillation determiner of the receiver is configured to:
   repeating, until determining that the receiver is no longer in the oscillation mode:
      monitoring a state of the receiver to determine whether the receiver is in an oscillation mode; and
      in response to determining that the receiver is in the oscillation mode, transmitting a power adjustment signal to a transmitter to request increasing the power received by the receiver;
   in response to determining that the receiver is not in the oscillation mode, repeating until the receiver starts oscillating:
      transmitting a power adjustment signal to request decreasing the power received by the receiver; and
      monitoring the receiver to determine when it enters the oscillating mode;
      identifying the power transmitted to the receiver when the receiver starts oscillating in the oscillating mode as the minimum operating power level; and
      transmitting a power adjustment signal to request increasing the power received by the receiver by a predefined headroom, the predefined headroom is configured to move operation of the receiver away from an oscillation threshold where the receiver enters the oscillation mode into the non-oscillating state.

9. The system of claim 8, wherein the monitor signal is determined as oscillating when the monitor signal swings outside an interval of greater than a first predetermined value for a first predetermined number of times in a first interval of time.

10. A method of oscillation control of a receiver of a wireless power system, comprising:
    determining an oscillation state of the receiver;
    in response to determining that the receiver is oscillating, repeating, until determining the receiver stops oscillating:
       monitoring an oscillation state of the receiver;
       in response to determining the receiver is in an oscillating mode, transmitting a power adjustment signal to request increasing the power received by the receiver;
    in response to determining the receiver is not in the oscillation mode, repeating until the receiver enters the oscillating mode:
       transmitting a power adjustment signal to request decreasing the power received by the receiver; and
       monitoring the oscillation state of the receiver;
       identifying the power transmitted to the receiver when the receiver starts oscillating as an oscillation threshold of the receiver;
    once the oscillation threshold is identified, transmitting a power adjustment signal to request increasing the power received by the receiver by a predefined headroom above the oscillation threshold, the predefined headroom is configured to move the oscillation state of the receiver away from the oscillation threshold into the non-oscillating state; and
    waiting for a predetermined amount of time for stabilizing the receiver.

11. A method of claim 10, further comprising:
    transmitting the power adjustment signal via a communication unit of the receiver and through wireless channels.

12. A method of claim 10, wherein the receiver of the wireless power system includes a rectifier, and wherein the method further comprises:
    determining the oscillation state of the receiver based at least on the oscillation state of the rectifier;
    determining the oscillation state of the rectifier based at least on determining a current or a voltage of the rectifier as oscillating.

13. The method of claim 12, further comprising:
    determining a voltage of the rectifier as oscillating when the rectifier voltage swings in a voltage interval of greater than a first predetermined value for a first number of times in a first interval of time;

determining a current of the rectifier as oscillating when the rectifier current swings in a current interval of greater than a second predetermined value for a second number of times in a second interval of time.

14. The method of claim 10, further comprising:

receiving a monitor signal from a rectifier of the receiver;

comparing the received monitor signal against an upper threshold and a lower threshold;

generating a range signal when the monitor signal crosses both the upper threshold and the lower threshold.

\* \* \* \* \*